United States Patent
Schwarz et al.

(10) Patent No.: US 10,474,915 B2
(45) Date of Patent: Nov. 12, 2019

(54) SYSTEM FOR COMPARING A HEAD POSITION OF A PASSENGER OF A MOTOR VEHICLE, DETERMINED BY A DETERMINATION UNIT, WITH A REFERENCE MEASUREMENT

(71) Applicant: Robert Bosch GmbH, Stuttgart (DE)

(72) Inventors: Anke Schwarz, Stuttgart (DE); Torsten Maka, Stuttgart (DE); Esther-Sabrina Wacker, Hildesheim (DE); Philippe Dreuw, Heersum (DE); Rüdiger-Walter Henn, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 15/789,057

(22) Filed: Oct. 20, 2017

(65) Prior Publication Data

US 2019/0057265 A1 Feb. 21, 2019

(30) Foreign Application Priority Data

Aug. 15, 2017 (DE) .................. 20 2017 104 899 U

(51) Int. Cl.

| | |
|---|---|
| G06K 9/00 | (2006.01) |
| B60K 28/02 | (2006.01) |
| G01B 11/00 | (2006.01) |
| G01B 11/03 | (2006.01) |
| G06F 3/01 | (2006.01) |

(Continued)

(52) U.S. Cl.
CPC .......... *G06K 9/00845* (2013.01); *B60K 28/02* (2013.01); *G01B 11/00* (2013.01); *G01B 11/03* (2013.01); *G06F 3/012* (2013.01); *G06F 3/0304* (2013.01); *G06F 3/0325* (2013.01); *G06K 9/6202* (2013.01); *G06T 7/248* (2017.01); *G06T 7/74* (2017.01); *G06T 7/80* (2017.01); *G08B 21/06* (2013.01); *G06K 9/78* (2013.01); *G06K 2209/21* (2013.01);
(Continued)

(58) Field of Classification Search
CPC .... G06K 9/00845; G06K 9/6202; G06K 9/78; G06K 2209/21; G06T 7/80; G06T 7/74; G06T 7/248; B60K 28/02; G01B 11/00; G01B 11/03; G06F 3/012; G06F 3/0304; G06F 3/0325; G08B 21/06
See application file for complete search history.

(56) References Cited

U.S. PATENT DOCUMENTS

| | | | | |
|---|---|---|---|---|
| 2004/0153229 | A1* | 8/2004 | Gokturk ............. | G06K 9/00362 701/45 |
| 2016/0235323 | A1* | 8/2016 | Tadi ..................... | A61B 5/7285 |
| 2019/0041979 | A1* | 2/2019 | Kirchner ............... | G01C 21/165 |

OTHER PUBLICATIONS

Robert Bosch GmbH, Poster: Schwarz, et al. "DriveAHead—A Large-Scale Driver Head Pose Dataset", CVPR 2017.
(Continued)

*Primary Examiner* — Ping Y Hsieh
(74) *Attorney, Agent, or Firm* — Norton Rose Fulbright US LLP; Gerard Messina

(57) ABSTRACT

A system for comparing a head position of a passenger of a motor vehicle, determined with the aid of a determination unit, with a reference measurement. The system includes at least one marking element which has at least one marking and is able to be fastened to the head of the passenger, and at least one movement detection element for detecting the position of the at least one marking of the marking element for the reference measurement.

16 Claims, 4 Drawing Sheets

(51) Int. Cl.

| | |
|---|---|
| *G06F 3/03* | (2006.01) |
| *G08B 21/06* | (2006.01) |
| *G06T 7/80* | (2017.01) |
| *G06T 7/73* | (2017.01) |
| *G06T 7/246* | (2017.01) |
| *G06K 9/62* | (2006.01) |
| *G06K 9/78* | (2006.01) |

(52) U.S. Cl.
CPC ............... *G06T 2207/30196* (2013.01); *G06T 2207/30204* (2013.01); *G06T 2207/30268* (2013.01)

(56) References Cited

OTHER PUBLICATIONS

Schwarz, et al.: "DriveAHead—A Large-Scale Driver Head Pose Dataset", Karlsruhe Institute of Technology, Germany, Robert Bosch GmbH (2017), pp. 1-7.

\* cited by examiner

SYSTEM FOR COMPARING A HEAD POSITION OF A PASSENGER OF A MOTOR VEHICLE, DETERMINED BY A DETERMINATION UNIT, WITH A REFERENCE MEASUREMENT

CROSS REFERENCE

The present application claims the benefit under 35 U.S.C. § 119 of German Patent Application No. DE 202017104899.3 filed on Aug. 15, 2017, which is expressly incorporated herein by reference in its entirety.

BACKGROUND INFORMATION

Modern motor vehicles are frequently equipped with systems that can be used for detecting the head position of passengers. Data sets, which were obtained using video cameras, 3D sensors or depth sensors, for example, are especially used for this purpose. In most cases, the accuracy of such systems can only be checked insufficiently.

SUMMARY

In accordance with the present invention, an advantageous system is provided for comparing a head position of a passenger of a motor vehicle that was determined with the aid of a determination unit with a reference measurement. Advantageous developments of the system are described herein.

The example system in accordance with the present invention is intended and configured specifically for carrying out a comparison between two measurements of the head position of the passenger. The head position is preferably determined using the determination unit, and the head position is preferably determined during the reference measurement. Preferably, the system is developed in such a way that the result of the comparison is able to be output by the system. This may be done in the form of one or more parameter(s), in particular. Based on the output parameters, in particular the agreement between the two compared measurements is able to be evaluated. Given an especially reliable reference measurement, especially the quality of the measurement performed with the aid of the determination unit is thereby able to be evaluated. In particular the value of a parameter that describes the deviation between the measurement with the aid of the determination unit and the reference measurement may be utilized as a criterion for evaluating the quality of the measurement carried out by the determination unit. The described system may be used especially for an accurate absolute reference measurement of the head position (i.e., specifically the position and orientation of the head). The described system is able to be utilized for evaluating algorithms for estimating the head position.

Measuring results pertaining to one or multiple passenger(s) may be managed with the aid of the described system. The passenger may be the driver, in particular, but also any other passenger.

The determination unit may be intended and designed especially for a permanent installation in the motor vehicle. The determination unit is therefore able to determine the head position of the passenger particularly during the conventional operation of the motor vehicle. For example, the data obtained in this manner may be taken into account in the triggering of safety functions (such as airbags).

Preferably, the reference measurement is not carried out while the motor vehicle is operated in the conventional manner. Instead, the reference measurement is performed only at individual points in time. For example, a single reference measurement may be carried out for the purpose of evaluating the accuracy of the determination unit. Depending on the result of this evaluation, the determination unit may be provided for a vehicle series, for instance.

For the duration of the reference measurement, the described system is preferably provided inside the motor vehicle. During the conventional operation of the motor vehicle, the described system is preferably not provided inside the vehicle.

The structure of the example system is described below.

The example system in particular includes a movement detection element, which may also be referred to as a reference system. The movement detection element is intended and configured specifically for measuring the head position (i.e. especially the head orientation and head position). The reference measurement may be carried out with the aid of the movement detection element.

In addition, the system includes a marking element, which has at least one marking and is able to be fastened to the head of the passenger. The marking element may also be called a head target.

The reference measurement is able to be carried out especially by determining the position of the markings of the marking element, which may be accomplished with the aid of the movement detection element, in particular.

Preferably, the described system is provided especially for use with a determination unit that is developed according to one of the following preferred specific embodiments.

In one preferred specific embodiment of the system, the determination unit for determining the head position of the passenger of the motor vehicle has at least one video camera as well as a first control element. The first control element is able to be used for detecting the position of characteristic points on the head of the passenger from data of the video camera.

The determination of the head position with the aid of the determination unit may be carried out in particular by analyzing the data of the video camera. The video camera preferably includes an image sensor, which offers both depth and infrared data. Both data strings are suitable for use in the motor vehicle inasmuch as they are robust with respect to extraneous light.

The characteristic points may also be referred to as landmarks or 3D face landmarks, in particular. Points in the face that are distinguished from their environment (for instance on account of their color and/or contrast) may especially be considered characteristic points. Characteristic points may lie around the eye, the nose and/or the mouth, in particular.

In one further preferred specific embodiment of the system, the first control element is designed in such a way that the position of the characteristic points with reference to a coordinate system of the determination unit is able to be output by the first control element.

When comparing the determination of the head position carried out with the aid of the determination unit and by the reference measurement, it is preferably and in particular taken into account in which coordinate systems the results of the individual measurements are output. In the specific embodiment at hand, the head position is determined by the determination unit in a separate coordinate system of the determination unit. A corresponding coordinate transformation preferably takes place for the comparison with the reference measurement.

Especially preferred in this context is the specific embodiment of the system in which the system also includes an evaluation element, which is intended and designed to ascertain a coordinate transformation between the coordinate system of the determination unit and a coordinate system of the head.

The coordinate system of the head is introduced for the purpose of converting the head position, determined by the determination unit, in such a way that a comparison with the reference measurement is possible.

Defining the coordinate system of the head in particular allows a specification of the particular axes about which the angle of rotation is measured. Axes of the coordinate system of the head may be defined in a fixed manner with reference to the head, in particular. This can be accomplished using characteristic points or face landmarks, for example. However, the coordinate system of the head may also be defined with the aid of characteristic points of the head that lie outside the face, for instance.

Using the evaluation unit, it is possible to obtain a coordinate transformation between the coordinate system of the determination unit and the coordinate system of the head, which is designated as $T_i^{k \to h}$. The information relating to the head position is contained especially in the coordinate transformation $T_i^{k \to h}$. This means that the coordinate transformation $T_i^{k \to h}$ is able to be output particularly as a function of angles that characterize the head position. It is therefore preferred to determine the coordinate transformation $T_i^{k \to h}$ individually for each image of the determination unit. If there is a change in the head position between two individual images, then the obtained coordinate transformation $T_i^{k \to h}$ will change as well. Index i indicates that the coordinate transformation $T_i^{k \to h}$ is defined for an individual image i.

In one further preferred specific embodiment of the system, the movement detection element is designed for motion tracking.

In this specific embodiment, the reference measurement preferably takes place according to the motion tracking principle (which may also be referred to as motion capturing). The motion tracking is preferably carried out using the markings of the marking element. The markings of the marking element preferably involve a plurality of 3D balls, which are able to be tracked during the motion tracking.

In one further preferred specific embodiment of the system, the motion detection element has at least one motion tracking sensor for the reference measurement as well as a second control element. The second control element may be used for detecting the position of at least one marking of the marking element based on data of the motion tracking sensor.

The motion tracking sensor may include a video camera, in particular. In contrast to the determination unit, the movement detection element or the motion tracking sensor is intended and designed to detect as particularly emphasized points the position of the markings of the marking element rather than face landmarks. A material that provides excellent reflection, so that the markings are clearly visible in comparison with their environment, may especially form the markings of the marking element.

The movement detection element in particular may allow for an exact measurement of the position and orientation of an object provided with special balls.

In one further preferred specific embodiment of the system, the second control element is designed in such a way that the position of the at least one marking of the marking element with reference to a global coordinate system is able to be output by the second control element.

The global coordinate system preferably is the reference system of the motor vehicle, meaning that the motor vehicle is at rest in the global coordinate system. In particular, axes of the global coordinate system may be fixedly defined with reference to the motor vehicle.

In one further preferred specific embodiment, the system also includes a first calibration element, which is able to calibrate a coordinate system of the determination unit relative to a global coordinate system.

The first calibration element may in particular be a specially created multi-chessboard. In other words, the first calibration element preferably includes a chessboard pattern as well as markings that are placed on the chessboard pattern. The chessboard pattern is able to be detected with the aid of the determination unit, while the markings are detectable by way of the movement detection element. Utilizing the arrangement of the markings relative to the chessboard pattern, it is possible to obtain a coordinate transformation between the global coordinate system (in which the reference measurement is performed) and the coordinate system of the determination unit.

Especially a chessboard as the first calibration element is able to be mounted at a precisely defined location of the motor vehicle. The chessboard is developed in the form of a multi-function board preferably featuring a visual chessboard pattern and precisely mounted balls. The chessboard pattern is suitable for calibrating the determination unit, while the movement detection element may utilize the balls for calibration purposes.

The ascertaining of this coordinate transformation may also be described as a calibration of the movement detection element and the determination unit into a common world coordinate system.

The transformation of the coordinate system of the determination unit into the global coordinate system, which is referred to as $T^{k \to w}$, is able to be obtained in this way, in particular. More specifically, a one-time determination of coordinate transformation $T^{k \to w}$ may suffice, meaning that the first calibration element is able to be introduced into the vehicle for the singular determination of coordinate transformation $T^{k \to w}$ and then may be removed again for the subsequent performance of the reference measurement.

In one further preferred specific embodiment of the system, the movement detection element is intended and designed to output a coordinate transformation between a global coordinate system and a coordinate system of the marking element.

The coordinate system of the marking element is preferably defined with reference to the marking element. This specifically means that axes of the coordinate system of the marking element are fixedly defined with reference to the marking element. In particular, different coordinate transformations between the global coordinate system and the coordinate system of the marking element result for different head positions. The information relating to the head position is included in the coordinate transformation, in particular. It is therefore preferred that the coordinate transformation from the global coordinate system to the coordinate system of the marking element be individually determined for each image of the movement detection element. If the head position changes between two individual images, then the obtained coordinate transformation also changes.

The coordinate transformation from the global coordinate system to the coordinate system of the marking element is denoted by $T_i^{w \to t}$. Index i here indicates that this coordinate transformation is defined for an individual image i.

In particular, it is possible to measure the position and orientation of the marking element during a test drive at any instant i and to determine coordinate transformation $T_i^{w \to t}$. The test drive preferably includes both a drive on an expressway and a drive on local roads.

In one further preferred specific embodiment, the system furthermore includes a second calibration element by which a coordinate system of the marking element is able to be calibrated relative to a coordinate system of the head of the passenger.

Using the second calibration element, a coordinate transformation between the coordinate system of the marking element and the coordinate system of the head is able to be obtained. This coordinate transformation is denoted by $T_n^{t \to h}$. Index n indicates that the coordinate transformation $T_n^{t \to h}$ may differ for each passenger and for each position of the marking element on the passenger's head. More specifically, the transformation $T_n^{t \to h}$ takes the fact into account that each person wears the marking element at an individual position and with an individual orientation, in accordance with the personal shape of the rear head. This transformation is determined individually for each passenger.

The coordinate transformation $T_n^{t \to h}$ may be determined in particular with the aid of the second calibration element. For this purpose, the second calibration element preferably has a 3D pointer by which the passenger is able to touch special characteristic points on the head, for example, and in particular in the face (such as face landmarks). The tip of the 3D pointer is detectable by the movement detection element. The characteristic points preferably involve the characteristic points that are used for the definition of the coordinate system of the head. The second calibration element makes it possible to determine the 3D positions of the characteristic points in the coordinate system of the marking element. The coordinate transformation $T_n^{t \to h}$ is able to be determined on that basis.

After the test drive, the points used for the definition of the coordinate system of the head are preferably marked once again by the second calibration element in order to validate the ride and to determine the measuring uncertainty of the marking element (which may result in particular from slippage of the marking element). It is preferred to validate the drive because the marking element may slip during the ride, for instance if the driver touches the vehicle roof or the neck rest with the marking element.

Using the described coordinate transformations, it is possible to carry out the comparison between the measurement performed with the aid of the determination unit and the reference measurement. It is especially preferred that a coordinate transformation $T_i^{k \to h}$ from the coordinate system of the determination unit into the coordinate system of the head is determined for each individual image of the determination unit. In addition, a coordinate transformation $T^{k \to w}$ from the coordinate system of the determination unit into the global coordination system is determined, preferably at least once. Moreover, a coordinate transformation $T_i^{w \to t}$ from the global coordinate system into the coordinate system of the marking element is determined, preferably for each individual image of the movement detection element. Also, a coordinate transformation $T_n^{t \to h}$ from the coordinate system of the marking element into the coordinate system of the head is preferably determined. This is preferably done once or multiple times individually for a passenger.

The coordinate transformation $T_i^{k \to h}$ theoretically corresponds to the linkage of the coordinate transformations $T^{k \to w}$, $T_i^{w \to t}$, and $T_n^{t \to h}$, at least if the individual images of the determination unit and the movement detection element were recorded simultaneously (that is to say, belong to the same head position of the passenger). The following should therefore apply:

$$T_i^{k \to h} = T^{k \to w} \cdot T_i^{w \to t} \cdot T_n^{t \to h}.$$

During the measurement, the determination unit and the movement detection element are preferably synchronized in time with a network time protocol (NTP). This especially allows the individual images of the determination unit and the movement detection element to be recorded at the same moments in time. The data from both systems may be recorded, in particular together with time-synchronized time stamps, with the aid of ADTF.

If the above equation is satisfied, the determination of the head position with the aid of the determination unit is identical to the reference measurement. In case of deviations between the determination of the head position using the determination unit and the reference measurement, this equation is no longer satisfied. The degree of the deviation between the linkage of the coordinate transformations $T^{k \to w}$, $T_i^{w \to t}$, and $T_n^{t \to h}$ and coordinate transformation $T_i^{k \to h}$ may be used as a measure of the accuracy of the determination of the head position with the aid of the determination unit (provided the reference measurement is considered to be particularly precise).

Whether the above equation is satisfied can be verified in the evaluation element, in particular. For this purpose, the linkage of the coordinate transformations $T^{k \to w}$, $T_i^{w \to t}$, and $T_n^{t \to h}$ is preferably calculated in the evaluation element and compared with the coordinate transformation $T_i^{k \to h}$ formed directly from the data of the determination unit. In particular, the evaluation element is able to output one or more parameter(s) that describe(s) the result of this comparison.

In addition to the continuous values of the head orientation and position, each individual image i is annotated with characteristics, preferably manually. For example, specially trained persons may mark each image with binary values, which indicate whether the driver is wearing sunglasses or glasses. In addition, for each image there is preferably a binary value that describes whether further covered areas are present within the face. For example, a face may be marked as covered as soon as at least one face landmark is covered. The scenario that this happens on account of self-coverages caused by pronounced rotations may be excluded and not be treated as coverage. Sunglasses and glasses may also be excluded and not considered coverages since they are annotated separately.

Additional details of the present invention and an exemplary embodiment, to which the present invention is not restricted, however, are described in greater detail with the aid of the figures.

DETAILED DESCRIPTION OF EXAMPLE EMBODIMENTS

Figure 1:
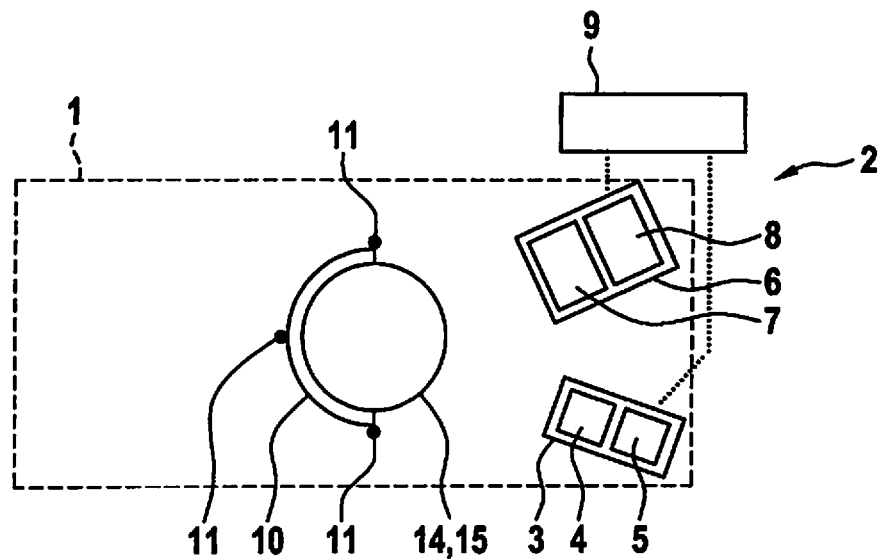
FIG. 1 shows an illustration of a system for the comparison of a head position of a passenger of a motor vehicle determined with the aid of a determination unit.

FIG. 1 shows a system 2 for the comparison of a head position of a passenger 14 of a motor vehicle 1, determined with the aid of a determination unit 3, with a reference measurement. System 2 includes a marking element 10, which has a plurality of markings 11 and which is able to be fastened to head 15 of passenger 14. In addition, system 2 includes a movement detection element 6 for detecting the position of markings 11 of marking element 10 for the reference measurement.

Determination unit 3 has a video camera 4 for determining the head position of passenger 14, as well as a first control element 5. With the aid of first control element 5, data from video camera 4 may be used to detect the position of characteristic points (shown in FIG. 5) on head 15 of passenger 14. First control element 5 is designed in such a way that the position of the characteristic points with reference to a coordinate system of determination unit 3 is output by first control element 5.

In addition, system 2 includes an evaluation element 9, which is intended and designed to ascertain a coordinate transformation between the coordinate system of determination unit 3 and a coordinate system of head 15.

Movement detection element 6 is designed for motion tracking and has a motion tracking sensor 7 for the reference measurement, as well as a second control element 8. With the aid of second control element 8, the position of at least one marking 11 of marking element 10 is able to be detected from data of motion tracking sensor 7. Second control element 8 is designed in such a way that the position of markings 11 of marking element 10 with reference to the global coordinate system is able to be output by second control element 8. Movement detection element 6 is intended and designed to output a coordinate transformation between the global coordinate system and the coordinate system of marking element 10.

Figure 2:
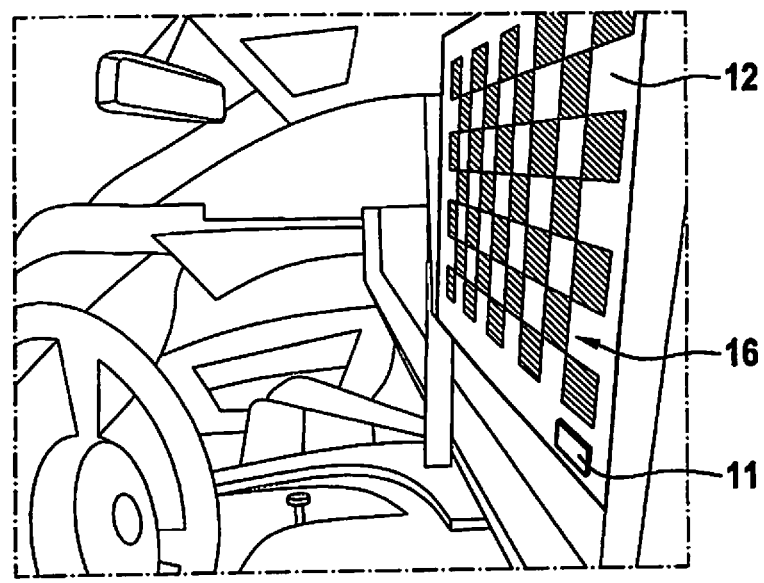
FIG. 2 shows an illustration of a calibration of a coordinate system of the determination unit relative to a global coordinate system with the aid of a first calibration element.

FIG. 2 shows a first calibration element 12, which has a chessboard pattern 16 and a plurality of markings 11. With the aid of first calibration element 12, the coordinate system of determination unit 3 is able to be calibrated relative to the global coordinate system.

Figure 3:
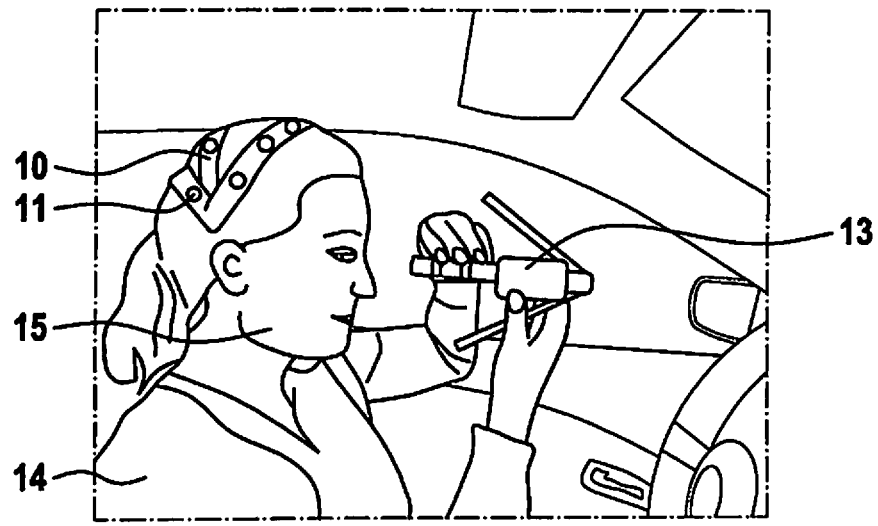
FIG. 3 shows an illustration of a calibration of a coordinate system of a marking element relative to the global coordinate system with the aid of a second calibration element.

FIG. 3 shows a second calibration element 13, which may be used for calibrating the coordinate system of marking element 10 relative to the coordinate system of head 15 of passenger 14. In addition, marking element 10 including markings 11 can be seen on head 15 of passenger 14 in FIG. 3.

Figure 4:
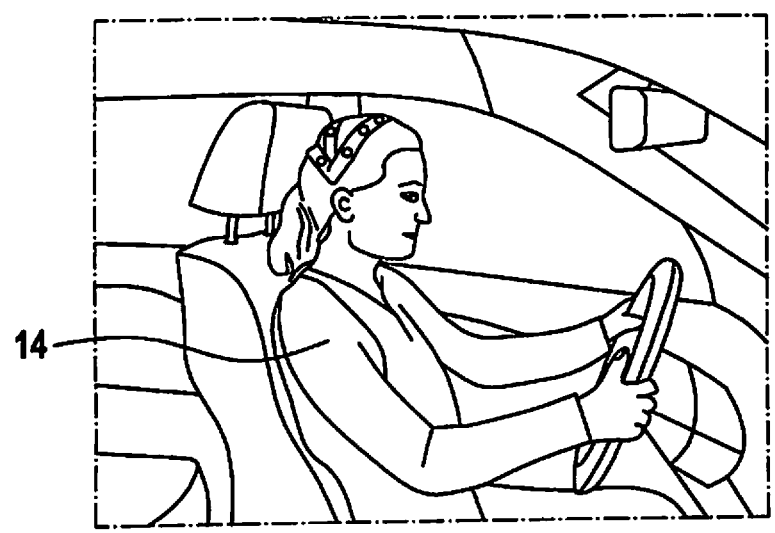
FIG. 4 shows an illustration of the passenger during the ride in the motor vehicle.

FIG. 4 shows passenger 14 while traveling in the motor vehicle.

Figure 5:
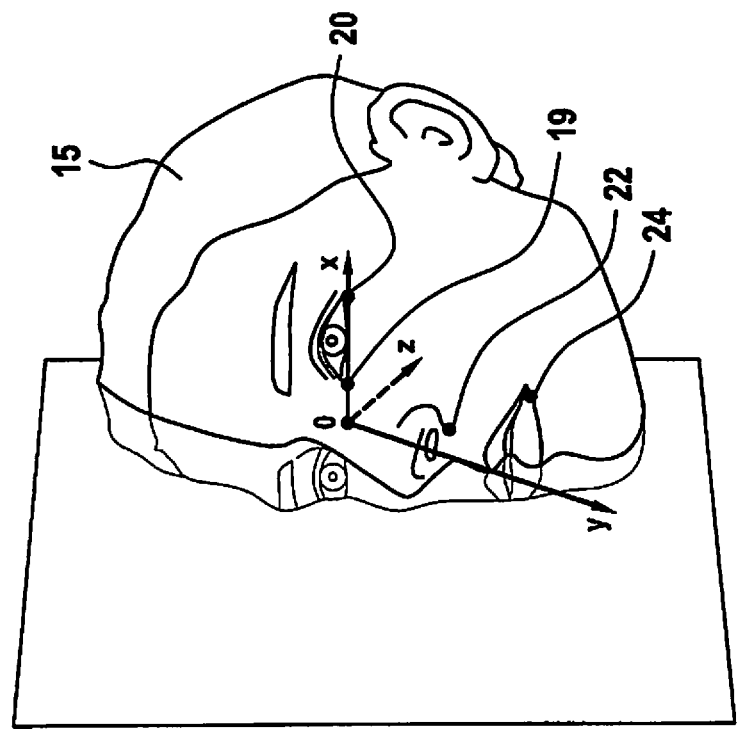
FIG. 5 shows two illustrations of a head of the passenger with the coordinate system of the head.
Figure 5:
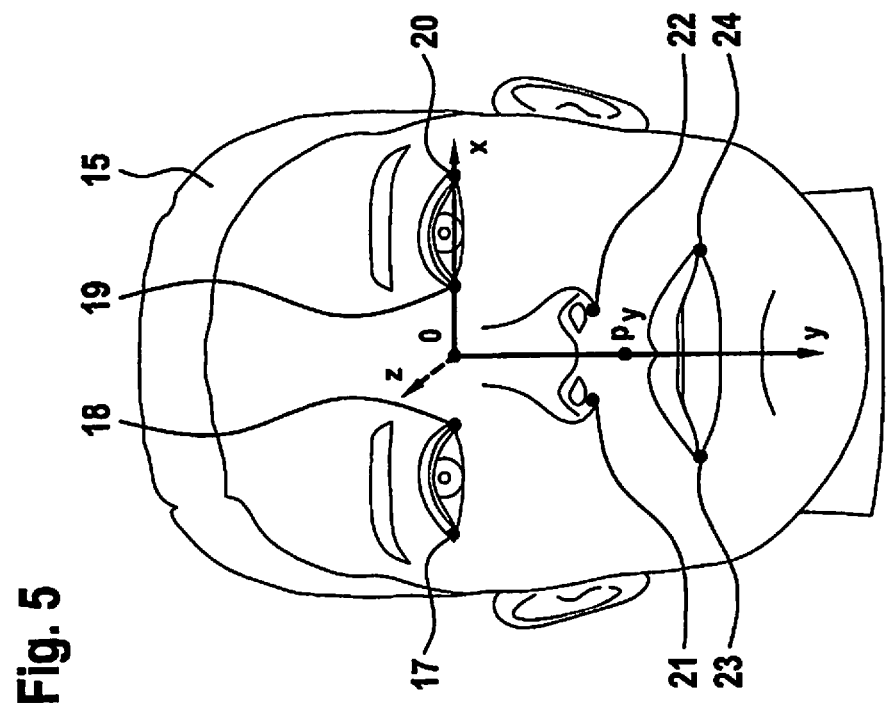

FIG. 5 shows head 15 of passenger 14 in two representations. A plurality of characteristic points are sketched, i.e. a first characteristic point 17, a second characteristic point 18, a third characteristic point 19, and a fourth characteristic point 20 at the corners of the eyes; a fifth characteristic point 21 and a sixth characteristic point 22 on the nose, as well as a seventh characteristic point 23 and an eighth characteristic point 24 on the mouth. In addition, a coordinate origin o as well as axes x, y and z have been sketched. The y axis is defined by a point $p_y$.

Figure 6:
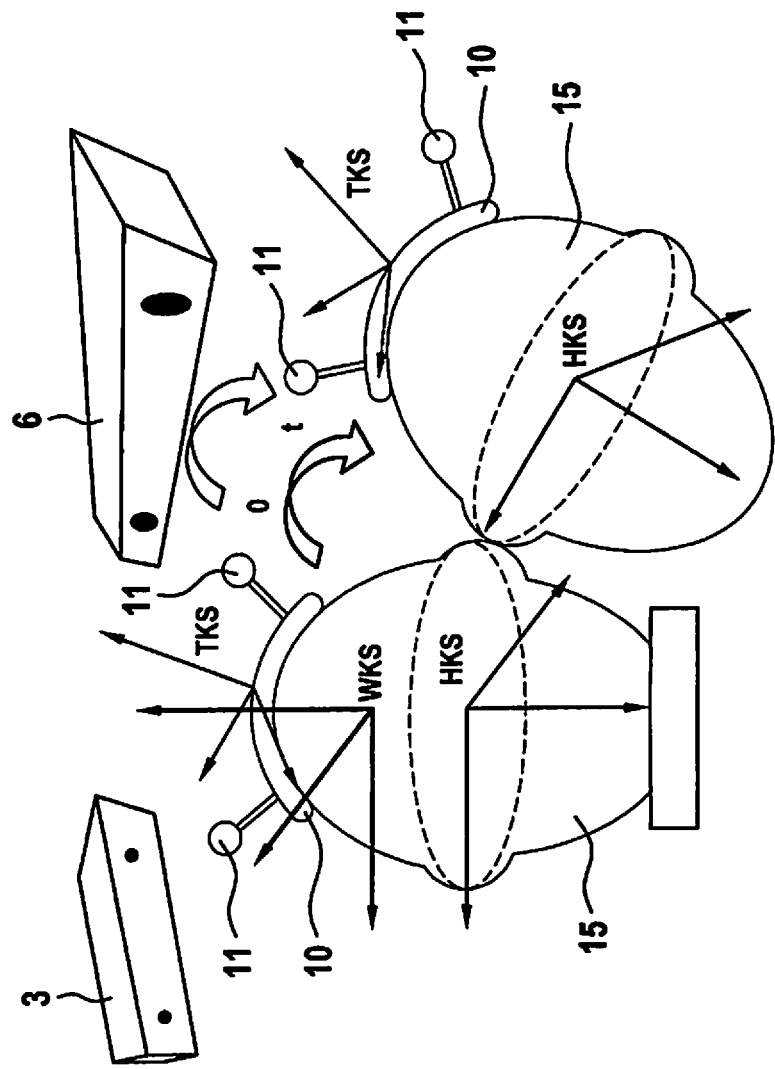
FIG. 6 shows an illustration of the coordinate systems.

FIG. 6 shows head 15 of passenger 14 in two head positions. Sketched in each case is the coordinate system of the head (HKS), the coordinate system of the marking element (TKS) as well as the global coordinate system (WKS). Also sketched are determination unit 3 and movement detection element 6 as well as marking element 10 including markings 11.

What is claimed is:

1. A system for comparing a head position of a passenger of a motor vehicle, determined with the aid of a determination unit, with a reference measurement, the system comprising:
at least one marking element which has markings and is able to be fastened to the head of the passenger; and
at least one movement detection element configured to detect a position of markings of the marking element for the reference measurement;
wherein the at least one movement detection element includes a first video camera, and the at least one movement detection element is configured to detect the position of the markings of the marking element based on video data from the first video camera and to provide the reference measurement based on the detected position of the markings of the marking element, the reference measurement describing the position and orientation of the head of the passenger.

2. The system as recited in claim 1, wherein the determination unit includes at least one second video camera for determining the head position of the passenger of the motor vehicle, and a first control element, wherein a position of characteristic points on the head of the passenger is able to be detected with the aid of the first control element from data of the second video camera.

3. The system as recited in claim 2, wherein the first control element is designed in such a way that the position of the characteristic points in relation to a coordinate system of the determination unit is able to be output by the first control element.

4. The system as recited in claim 3, further comprising:
an evaluation element designed to ascertain a coordinate transformation between the coordinate system of the determination unit and a coordinate system of the head.

5. The system as recited in claim 2, wherein the first video camera is separate from the second video camera.

6. The system as recited in claim 1, wherein the movement detection element is designed for motion tracking.

7. The system as recited in claim 1, wherein the movement detection element includes, for the reference measurement, at least one motion tracking sensor and a second control element, and the position of at least one marking of the marking element is detected with the aid of the second control element from data of the motion tracking sensor, wherein the motion tracking sensor includes the first video camera.

8. The system as recited in claim 7, wherein the second control element is designed in such a way that the position of the at least one marking of the marking element in relation to a global coordinate system is able to be output by the second control element.

9. The system as recited in claim 1, further comprising:
a first calibration element by which a coordinate system of the determination unit is able to be calibrated relative to a global coordinate system.

10. The system as recited in claim 9, wherein the first calibration element includes a chessboard pattern mounted in the motor vehicle.

11. The system as recited in claim 1, wherein the movement detection element is designed to output a coordinate transformation between a global coordinate system and a coordinate system of the marking element.

12. The system as recited in claim 1, further comprising:
a second calibration element by which a coordinate system of the marking element is able to be calibrated relative to a coordinate system of the head of the passenger.

13. The system as recited in claim 12, wherein the second calibration element includes a 3D pointer detectable by the at least one movement detection element.

14. The system as recited in claim 1, wherein the markings include a plurality of 3D balls.

15. The system as recited in claim 1, wherein the markings are formed of a reflective material.

16. The system as recited in claim 1, wherein the system is situated inside the motor vehicle.

* * * * *